US005228890A

United States Patent [19]

Söderlund et al.

[11] Patent Number: 5,228,890

[45] Date of Patent: Jul. 20, 1993

[54] CYCLONE SEPARATOR

[75] Inventors: Patrik Söderlund, Lund; Lennart Sjöstedt, Åryd, both of Sweden

[73] Assignee: Sunstrom Safety AB, Lagan, Sweden

[21] Appl. No.: 930,651

[22] PCT Filed: Mar. 22, 1991

[86] PCT No.: PCT/SE91/00223

§ 371 Date: Oct. 2, 1992

§ 102(e) Date: Oct. 2, 1992

[87] PCT Pub. No.: WO91/14494

PCT Pub. Date: Oct. 3, 1991

[30] Foreign Application Priority Data

Mar. 23, 1990 [SE] Sweden ............................ 9001054

[51] Int. Cl.[5] ........................................ B01D 45/12

[52] U.S. Cl. .................................. 55/421; 55/337; 55/459.4; 55/461; 55/DIG. 17

[58] Field of Search ..................... 55/337, 421, 459.1, 55/459.3, 459.4, 461, DIG. 17

[56] References Cited

U.S. PATENT DOCUMENTS

| | | | |
|---|---|---|---|
| 3,528,216 | 9/1970 | Garrett | 55/421 X |
| 4,801,310 | 1/1989 | Bielefeldt | 55/461 X |

FOREIGN PATENT DOCUMENTS

| | | |
|---|---|---|
| 249023 | 12/1987 | European Pat. Off. . |
| 641877 | 2/1937 | Fed. Rep. of Germany . |
| 716750 | 1/1942 | Fed. Rep. of Germany . |
| 1519985 | 3/1969 | Fed. Rep. of Germany . |
| 3825155 | 12/1988 | Fed. Rep. of Germany . |
| 1287552 | 2/1962 | France . |
| 96760 | 9/1939 | Sweden . |
| 171792 | 6/1960 | Sweden . |

*Primary Examiner*—Charles Hart
*Attorney, Agent, or Firm*—Shapiro and Shapiro

[57] ABSTRACT

The invention relates to an air cleaner in the form of a cyclone separator comprising a cyclone chamber (2), a gas-feeding nozzle (11) which is directed tangentially to the wall (12) of the cyclone chamber, and a gas outlet (7). The invention is characterized in that the cyclone separator comprises a liquid trap (9, 13) arranged in the wall (12) of the cyclone chamber. Further the nozzle and the liquid trap extend along substantially the entire height of the cyclone chamber. The liquid trap comprises axial grooves (13) and a chamber (9) having an inlet gap (15) which connects the chamber (9) with the cyclone chamber (2) for diverting liquid droplets.

8 Claims, 1 Drawing Sheet

CYCLONE SEPARATOR

The present invention relates to a cyclone separator comprising a cyclone chamber, a gas inlet directed tangentially to the wall of said cyclone chamber, and a gas outlet.

BACKGROUND OF THE INVENTION

The present invention refers to a field in gas cleaning, which concerns separating liquid droplets and dust from a gas. The gas can be e.g. compressed air and the liquid can be water. For cleaning of gas, cyclone separators are generally employed. The principle of cyclone separators is tested. Gas is conducted to a cyclone chamber and caused to flow at high speed in the chamber. Dust and liquid droplets in the gas are deposited on the wall of the chamber along which they flow down to a collecting vessel. The vessel is emptied either automatically or manually. The gas is discharged through a filter.

In practice, the gas inlet of a small cyclone separator is directed substantially axially to the cyclone chamber. In a lower portion of the cyclone chamber, above the collecting vessel, the gas is caused to turn abruptly, the gas being discharged through an outlet portion which is fitted with a filter and arranged centrally in the chamber, while dust and liquid droplets impinge on a plate. The dust and the droplets drip from the plate and the wall and, finally, down into the collecting vessel which can be equipped with a drain outlet.

The inlet of a large cyclone separator, the height of which can be some ten metres, is directed in a substantially tangential manner. The gas inlet extends along a minor, upper part of the height of the cyclone chamber. Gas flows helically down in the chamber, while dust and liquid droplets are deposited on the wall of the cyclone chamber.

OBJECTS AND ADVANTAGES OF THE INVENTION

It is difficult to achieve an adequate degree of efficiency with conventional cyclone separators.

The object of the present invention is to overcome this problem.

A further object is to provide a cyclone separator which can be manufactured as a unit in an inexpensive, quick and easy manner. One more object is to provide a cyclone separator for large flows, which can be obtained by making the unit longer.

The invention also brings advantages in the form of a further improved degree of efficiency. In a cyclone separator according to the invention, use can be made of a larger filter as compared to a conventional cyclone separator of a corresponding size. The invention also permits embodiments which have a satisfactory degree of efficiency for highly varying flows of gas. In one embodiment of the invention, the flow of gas can range from 100 to 3000 l/min.

BRIEF DESCRIPTION OF THE INVENTION

The objects are achieved by means of a cyclone separator which according to the invention comprises a cyclone chamber, a gas-feeding nozzle and a gas outlet. The nozzle is directed substantially tangentially to the wall of the cyclone chamber and extends along substantially the entire height of the cyclone chamber. A liquid trap is arranged in the wall of the cyclone chamber and extends along substantially the entire height of the cyclone chamber.

Further embodiments are stated in the subclaims.

DETAILED DESCRIPTION OF THE INVENTION

An embodiment of the present invention is described below with reference to the accompanying drawings.

Figure 1:
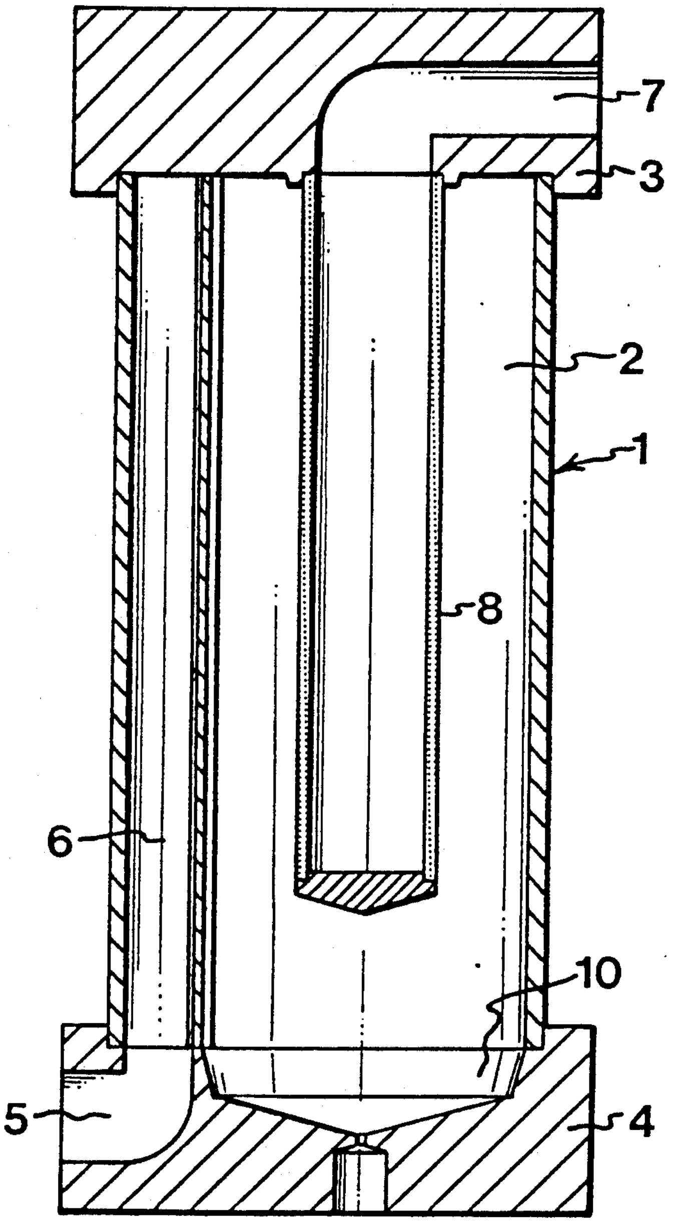
Figure 2:
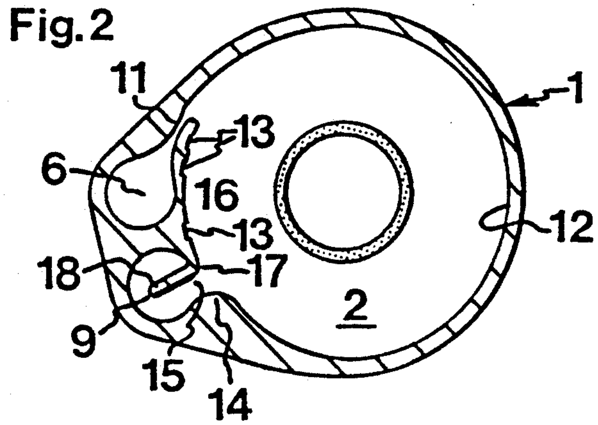

FIG. 1 is a schematic side view of a cyclone separator according to the invention, and FIG. 2 is a schematic, sectional view from above of the cyclone separator.

The embodiment of a cyclone separator according to the present invention as shown in the drawings is an exemplification. The cyclone separator 1 comprises a cyclone chamber 2 standing vertically, the upper end of which is closed by means of a cover member 3 and the lower end of which is closed by means of a base member 4.

Via a gas inlet 5, the gas to be cleaned is introduced into the base member 4. In this example, the gas is compressed air having a positive pressure of about 8 bars. The gas inlet is connected with an inlet chamber 6 which is described in more detail below. The cover member 3 is formed with a gas outlet 7 which is connected with a filtering unit 8. A liquid trap 9 is connected with a collecting chamber 10 positioned in the base member 4.

Reference is now made to FIG. 2 which illustrates how the cyclone separator 1 is formed in one piece, preferably of extruded aluminium, or extruded plastic, and comprises the cyclone chamber 2, the inlet chamber 6 and the liquid trap 9. The liquid trap and the inlet chamber extend in parallel with the axis of the cyclone chamber 2. The inlet chamber 6 is connected with the cyclone chamber 2 via a nozzle 11. The nozzle is directed tangentially to the wall 12 of the cyclone chamber. The nozzle is formed as a jet for producing a high velocity of flow of the air supplied, e.g. close to the sonic speed. The nozzle 11 extends as a gap along substantially the entire height of the cyclone chamber.

The air is taken in through the nozzle and forced to circulate round the wall of the cyclone chamber. Liquid droplets are deposited on the wall. Some of the liquid droplets, however, accompany the flow of air through practically the whole turn and are collected in the liquid trap 9 or in special droplet trapping means 13 (which also are a sort of liquid traps). The liquid trap 9 is designed as an elongate chamber of substantially circular cross-section, extending along substantially the entire height of the cyclone chamber 2.

A plurality of means coact to collect liquid droplets in the liquid trap 9. As seen in the direction of the flowing air, the liquid droplets are met by a droplet bead 14 adjacent the liquid trap. The droplet bead is of a large radius which prevents liquid droplets from being separated. In a portion of the droplet bead, where the tangential velocity of air is close to zero, the droplets are accumulated as large drops which roll downwards. The liquid trap opening 15 which is an elongate gap is larger than the diameter of the droplets. In this embodiment, use is made of a droplet opening of about 4 mm for preventing liquid droplets from climbing from the droplet bead to a part of the cyclone chamber wall 12 which constitutes a bridge 16 between the droplet opening and the nozzle 11. From an edge 17 of the bridge, which is closest to the droplet opening, extends a vortex breaker 18, for example in the form of a flange, into the liquid trap. The vortex breaker prevents air from flowing in the liquid trap, particularly stationary vortices of air. Thus, it is made possible for the accumulated drops to roll down towards the collecting chamber 10.

The droplets which are deposited on the bridge 16 and those which after all cross the droplet opening 15 are received as they reach the droplet trapping means 13 on the bridge. The droplet trapping means 13 are formed as shallow, axially directed grooves in the bridge, and in each droplet trapping means, microscopic vortices are produced and bind the remaining liquid droplets.

The liquid which flows along the walls of the cyclone chamber and the liquid trap 9 is collected in the collecting chamber 10 in the base member 4 of the cyclone separator.

In an embodiment not shown in the drawings, the cover member 3 is also formed with a liquid trap. This liquid trap comprises two circular concentric grooves in the lower side of the cover member, which communicate with one another and with the wall of the cyclone chamber 2, so that liquid collected in the liquid trap of the cover member also flows down in the collecting chamber 10.

The air which is now cleaned flows in the direction of the outlet which is fitted with a filter and is positioned coaxially, centrally in the cyclone chamber 2. The velocity of the air is considerably reduced the more it approaches the centre. The velocity of the air is a few metres per second as it reaches the filter. Since the entire height of the cyclone chamber can be used to blow in air, it is possible to mount a larger filter as compared to prior art cyclone separators of the same size.

The embodiment illustrated is but an exemplification, and parts of the structure can be designed in some other manner, without deviating from the invention as defined in the claims. For example, it is possible to exchange the flange form of the vortex breaker for some other means preventing air from flowing. Several variants of the liquid trap 9 are also feasible, in which lee is produced, so that the liquid trap does not to any considerable extent interfere with the flow pattern, i.e. the air currents in the cyclone chamber.

We claim:

1. Cyclone separator comprising a cyclone chamber (2), a gas inlet (5) formed with a gas-feeding nozzle (11) which is directed tangentially to the wall (12) of said cyclone chamber, and a gas outlet (7), characterized in that at least one liquid trap (9, 13) is arranged in the wall (12) of said cyclone chamber;

that both said liquid trap and said nozzle (11) extend along substantially the entire height of the cyclone chamber;

that said liquid trap comprises axial grooves (13) and a chamber (9) having an inlet gap (15) which connects said chamber (9) with said cyclone chamber (2) for diverting liquid droplets.

2. The cyclone separator as claimed in claim 1, characterized by means (18) for preventing air from flowing freely in said liquid trap.

3. The cyclone separator as claimed in claim 2, characterized in that the opening of said inlet gap (15) is so wide as to prevent separation of droplets from a droplet bead (14), which forms the first edge of said inlet gap, onto the second edge (17) thereof; and that said means for preventing air from flowing freely is a vortex-breaking means (18) which is arranged in said liquid trap.

4. The cyclone separator as claimed in claim 1 characterized in that the nozzle (11) is designed to produce an air current which, when entering the cyclone chamber (2), has a speed which is so high that it can be close to the sonic speed.

5. The cyclone separator as claimed in claim 1 characterized in that said nozzle (11) is connected to an inlet chamber (6) which extends in parallel with said cyclone chamber (2).

6. The cyclone separator as claimed in claim 1 characterized in that said cyclone chamber (2) is substantially circular-cylindrical.

7. The cyclone separator as claimed in claim 1 characterized in that it is made in one piece of extruded aluminium.

8. The cyclone separator as claimed in claim 1 characterized in that it is made of extruded plastic.

* * * * *

UNITED STATES PATENT AND TRADEMARK OFFICE

CERTIFICATE OF CORRECTION

PATENT NO. : 5,228,890

DATED : July 20, 1993

INVENTOR(S) : Patrik SODERLUND et al.

It is certified that error appears in the above-indentified patent and that said Letters Patent is hereby corrected as shown below:

ON THE COVER SHEET:

In item [73], the identification of the Assignee should read --Sundstrom Safety AB, Lagan, Sweden--.

Signed and Sealed this

Nineteenth Day of April, 1994

Attest:

BRUCE LEHMAN

*Attesting Officer*

*Commissioner of Patents and Trademarks*